United States Patent [19]
Bastioli et al.

[11] Patent Number: 5,512,378
[45] Date of Patent: Apr. 30, 1996

[54] BIODEGRADABLE STARCH BASED ARTICLES

[75] Inventors: Catia Bastioli; Giancarlo Romano, both of Novara; Mario Scarati, Milan; Maurizio Tosin, Serravalle Sesia, all of Italy

[73] Assignee: Novamont S.p.A., Milan, Italy

[21] Appl. No.: 376,303

[22] Filed: Jan. 23, 1995

Related U.S. Application Data

[63] Continuation of Ser. No. 989,221, Dec. 11, 1992, abandoned.

[30] Foreign Application Priority Data

Dec. 12, 1991 [IT] Italy .................. TO91A0969

[51] Int. Cl.⁶ ....................................... B32B 9/04
[52] U.S. Cl. ......................... 428/484; 428/485; 428/497; 428/498; 428/532; 428/533; 428/913
[58] Field of Search ................... 428/484, 497, 428/498, 485, 532, 533, 913

[56] References Cited

U.S. PATENT DOCUMENTS

| | | | |
|---|---|---|---|
| 3,616,106 | 10/1971 | Moyer | 428/485 |
| 3,717,534 | 2/1973 | Duling et al. | 428/485 |
| 5,091,212 | 2/1992 | Knott et al. | 428/516 |
| 5,106,677 | 4/1992 | Yeh et al. | 428/484 |
| 5,155,160 | 10/1992 | Yeh et al. | 428/484 |

FOREIGN PATENT DOCUMENTS

| | | |
|---|---|---|
| 0032802 | 7/1981 | European Pat. Off. . |
| 0388924 | 9/1990 | European Pat. Off. . |
| 0400532 | 12/1990 | European Pat. Off. . |
| WO90/10671 | 9/1990 | WIPO . |
| WO91/02024 | 2/1991 | WIPO . |
| WO91/02025 | 2/1991 | WIPO . |
| WO9215454 | 9/1992 | WIPO . |
| 2094495A | 12/1992 | WIPO . |

*Primary Examiner*—P. C. Sluby
*Attorney, Agent, or Firm*—Bryan Cave

[57] ABSTRACT

Thin-walled biodegradable starch-based articles, particularly sheets of film including at least one first layer of polymeric material including starch and at least one second layer of hydrophobic material, are characterized in that the second layer includes a natural or synthetic wax or mixture of waxes.

21 Claims, No Drawings

BIODEGRADABLE STARCH BASED ARTICLES

This is a continuation of U.S. application Ser. No. 07/989,221, filed Dec. 11, 1992, abandoned.

The present invention relates to biodegradable articles and particularly to thin-walled articles such as starch-based films (sheets) which are substantially insoluble in water and can constitute effective liquid-, gas- and vapour-barriers.

EP-A-0 032 802 describes the production of self-supporting, flexible and biodegradable films produced from formulations including starch, ethylene-acrylic acid copolymer and polyethylene.

EP-A-0 400 532 describes the production of films which have good mechanical characteristics and are produced from formulations based on starch and ethylene-vinyl alcohol copolymer.

The films produced according to the methods of the patent applications cited above have good tear strength and resistance to dissolving in water and can therefore be used to replace conventional, non-biodegradable synthetic, thermoplastic materials for a wide range of applications. In the presence of water, however, the films tend to swell, which adversely affects their properties as gas- and vapour-barriers.

EP-A-0 388 924 describes composite films including a layer of starch and a synthetic thermoplastic polymer and a layer of a barrier material which is deposited or laminated onto the starchy layer and is constituted by a copolymer or terpolymer of vinylidene chloride, copolymers of vinyl chloride and methyl acrylate, copolymers or terpolymers of vinylidene chloride and vinylidene fluoride, copolymer of ethylene-vinyl alcohol and nylon with polyvinylidene chloride.

WO90/14938 describes a method of producing films which are derived from starch with a high amylose content and can be laminated with polymeric materials having barrier properties, such as polypropylene, polyethylene, polyvinyl chloride, polycarbonate, polystyrene, polyesters, ionomer resins, acrylates and nylon.

The object of the present invention is to provide a laminated film which has good mechanical and barrier properties while its biodegradability characteristics remain unchanged or are improved.

For this purpose, the subject of the invention is a laminated film including at least one first layer of polymeric material including starch and at least one second layer of hydrophobic material, characterised in that the second layer includes a natural or synthetic wax.

In a first embodiment, the hydrophobic material is constituted essentially by natural or synthetic wax. The natural waxes include:

petroleum waxes, such as paraffin waxes with n-alkane contents of from about 75% to about 100% by weight and molecular weights of from about 280 to about 560 ($C_{20}$–$C_{40}$), microcrystalline waxes composed mainly of isoparaffinic and naphthenic hydrocarbons saturated with n-alkanes and having molecular weights within the range of from 450 to 800 ($C_{35}$–$C_{60}$) with melting points within the range of from 50° to 90° C., animal waxes such as beeswax and spermaceti wax, in particular, vegetable waxes such as candelilla waxes, carnauba waxes, Japan wax, ouricury wax, bayberry wax, jojoba wax and montan wax.

The synthetic waxes include, in particular, Fischer-Tropsch wax, polyethylene waxes, fatty acids and amides of fatty acids.

The waxy materials are used in solution, in aqueous emulsion, or in the fused state and are applied to the starchy layer in thicknesses which, according to the desired barrier properties, may vary within wide limits, typically from 0.2 microns to 20 microns, preferably from 0.5 microns to 10 microns.

Alternatively, the hydrophobic material used as the second layer is constituted by a mixture of two or more waxes or by a mixture of one or more waxes with a polymeric material selected from the materials mentioned below and mixtures thereof:

a) poly-ethylene-vinyl alcohol with an ethylene content of from about 15% to about 90% in moles, preferably from 30% to 50% in moles, b) ethylene-acrylic acid or ethylene-acrylic acid-alkyl acrylate copolymers with ethylene contents of from 10 to 30% in moles, preferably about 20% in moles, with free carboxylic acid groups or carboxylic acid groups salified by a base, preferably ammonium hydroxide, c) polyvinyl acetate, d) copolymers of ethylene-vinyl acetate containing from 5 to 50% in moles, preferably from 10 to 40% in moles, of vinyl acetate, e) rosin or rosin derivatives such as abietic acid, levopimaric acid and palustric acid and esters thereof, such as methyl, ethyl, hexadecyl, oxypyranylmethyl, 2-hydroxyethyl, 3-hydroxyvinyl esters and esters of 1,2,3-propantriol, and addition products of the acids mentioned above formed with maleic anhydride and copolymers of those acids with glycols, particularly glycerol, and phthalic acids, f) alkyd resins such as vegetable oils, for example, linseed oil, safflower oil, sunflower oil, soya oil, rape oil, castor oil, tung oil, oiticica oil and tall oil, g) natural gum in emulsion or thermoplastic gum.

Particularly when the hydrophobic layer is applied in emulsion, the compositions may include:

additives which can improve the wettability of the films, such as alcohols, for example, methyl, ethyl, propyl, isopropyl, butyl and isobutyl alcohols and glycols such as, for example, 2-methoxyethanol, 2-ethoxyethanol, 2-butoxyethanol, polyethylene glycol and polypropylene glycol;

surfactants and stabilisers, such as alkyl sulphates, aryl sulphates, alkyl sulphonates, aryl sulphonates, derivatives of ethylene oxide, fatty acids, alkylamine salts, quaternary ammonium salts, starch, dextrin, hydroxyethyl cellulose, hydroxypropyl cellulose, carboxymethyl cellulose (sodium salt), methyl cellulose and polyvinyl alcohol;

thickeners such as, for example, starch, methyl cellulose, hydroxyethyl cellulose, alginate, casein and polyurethanes;

plasticisers such as dibutyl phthalate, n-heptyl acrylate, 2-ethylhexyl acrylate, 2-ethylhexyl maleate, 2-ethylhexyl fumarate, dibutyl sebacate, polyglycol adipate, tricresyl phosphate, dioctyl phthalate, tributoxyethyl phosphate;

fillers and pigments such as titanium dioxide, talc, calcium carbonate, and silica.

Alternatively, if the hydrophobic coating material is applied by coextrusion or casting techniques or by a hot-melt technique, the waxy materials are preferably mixed with components selected from:

ethylene-vinyl acetate copolymers containing from 5 to 50% in moles, preferably from 10 to 40% in moles, of vinyl acetate, possibly in the presence of rosin and rosin derivatives, particularly addition products formed with maleic anhydride, ethylene-acrylic acid or ethylene-acrylic acid-alkyl acrylate copolymers with free carboxylic acids, and ethylene-vinyl alcohol copolymers with ethylene contents of from about 50% to about 97% in moles, preferably from 60 to 90% in moles, polyhydroxyalkanoate copolymers, particularly PHB (polyhydroxybutyrate), or PHB/V (polyhydroxybutyrate/valerate), copolymers of (D, L.) and (L) lactic acid, poly-epsilon-caprolactone, lactic acids copolymerised with glycolic acids and/or with epsilon-caprolactone, conjugated or non-conjugated fatty acids, such as oleic, linoleic, linolenic, ricinoleic, eleostearic, licanic and palmitic acids.

Plasticisers (phthalates, fatty acids, vegetable oils), pigments, fillers, UV stabilisers, antioxidants and antioxidising agents may be added to the products at the extrusion stage.

If the hydrophobic layer is constituted by a mixture of one or more waxes with a synthetic polymer such as those mentioned above, the composition preferably includes from 10 to 100% of wax and from 0 to 90% by weight of synthetic polymer, with reference to the sum of the wax and the synthetic polymer.

Laminated films including a first starchy layer, a second hydrophobic layer formed essentially by a wax or a mixture of waxes, and a third layer also having hydrophobic properties and formed by a mixture of one or more waxes with one or more of the substances a)–g) mentioned above fall within the scope of the invention.

Laminated films formed by a starchy layer treated on both sides with a wax-based coating or a coating including one or more waxes with one of more of the substances a)–g) also fall within the scope of the invention.

The starchy layer may be formed by starch, possibly including plasticiser or, preferably, by a polymeric composition including starch and a synthetic thermoplastic polymer.

Polymeric compositions including starch and a synthetic thermoplastic polymer suitable for producing the first starch-based layer of the laminated film according to the invention are described in the patent applications WO90/10671, WO91/02025, WO91/2024 and EP-A-0 400 532.

The preferred polymers used in the starchy mixture are polymers and copolymers which are derived from ethylenically unsaturated monomers and which have repeating units with at least one polar functional group such as a hydroxy, alkoxy, carboxy, carboxyalkyl, alkylcarboxy or acetal group. Preferred polymers include polyvinyl alcohol and copolymers of an olefin selected from ethylene, propylene, isobutene and styrene with acrylic acid, vinyl alcohol and/or vinyl acetate. These olefin copolymers include, in particular, ethylene copolymers such as ethylene-acrylic acid, ethylene-vinyl alcohol, ethylene-vinyl acetate and mixtures thereof. Particularly preferred are polyvinyl alcohol and copolymers of polyvinyl acetate and ethylele-vinyl alcohol with ethylene contents of from 10 to 50% by weight, produced by the hydrolysis of the corresponding polymers of ethylene-vinyl acetate, with degrees of hydrolysis generally of between 50 and 100%.

The synthetic polymeric component may also include epsilon-polycaprolactone or copolymers thereof, polyhydroxybutyrate/valerate or polymers or copolymers of lactic acid with glycolic acid or caprolactone.

The starch used in these polymeric compositions is preferably a native starch, particularly a maize starch or potato starch. The term "native" includes starches with high amylose contents and "waxy" starches. However, starches which have been modified physically or chemically, such as starch ethoxylates, starch acetates, cationic starches, oxidised starches and cross-linked starches may also be used. The native starch is normally used in the preparation of the formulations without being dried beforehand and has an intrinsic water content of about 9–15% by weight.

The method of preparing the starchy films does not differ substantially from the known methods already described in the patent literature cited above. In fact, the compositions are prepared by the mixing of the components in an extruder heated to a temperature high enough to produce a thermoplastic melt.

The composition supplied by the extruder includes starch, synthetic thermoplastic polymer, water and/or a high-boiling plasticiser in concentrations of between 1 and 50% by weight, preferably between 5% and 25% by weight, with reference to the weight of the total composition.

Suitable plasticisers include, in particular, glycerine, ethylene or propylene glycol, ethylene or propylene diglycol, ethylene or propylene triglycol, polyethylene glycol, polypropylene glycol, 1,2-propandiol, 1,3 propandiol, 1,2-, 1,3-, 1,4-butandiol, 1,5-pentandiol, 1,6-, 1,5-hexandiol, 1,2, 6-, 1,3,5-hexantriol, neopentylglycol, trimethylol propane, pentaerythritol, sorbitol and the acetate, ethoxylate and propoxylate derivatives thereof, particularly sorbitol ethoxylate, pentaerythritol ethoxylate, sorbitol acetate, pentaerythritol acetate, or a mixture of the plasticisers mentioned above.

The material supplied to the extruder may also include agents which can destroy hydrogen bonds, such as urea, and of which quantities of from 0.5 to 20% by weight, preferably between 2 and 7% by weight, with reference to the total composition, may be added to the starch and polymer mixture.

The polymeric material may also include cross-linking agents, such as aldehydes, ketones and glyoxals, process coadjuvants, release agents and lubricants, such as fatty acids, esters of fatty acids, higher alcohols, polyethylene waxes, antioxidants, opacifiers and stabilisers which are normally incorporated in compositions for moulding and extrusion. The formulation of the starchy layer may also include small quantities of hydrophobic polymers such as polyethylene, polypropylene, polystyrene, polystyrene/butadiene, in quantities generally no greater than 5% by weight with reference to the weight of the total composition.

EXAMPLE 1

Preparation of the starchy film 37 parts of GLOBE 3401 starch (11% by weight of water), 37 parts of ethylene-vinyl alcohol polymer with an ethylene content of 42% in moles and a degree of hydrolysis of the acetate groups of 99.5%, 3 parts of ethylene-acrylic acid copolymer with 20% of acrylic acid, with a melt flow index of 2 (at 125° C. and 0.325 Kg load) 5 parts of urea, 15 parts of sorbitol ethoxylate and 2.7 parts of water were mixed in a single-screw OMC extruder with a screw diameter d of 20 mm and an L/d of 30, having an intermediate degassing section and operating with the following heating profile:

90°–180°–150°–140° C. (heating profile set).

The extruded material was transformed into pellets and processed by extrusion and blowing at about 160° C. to produce films having an average thickness of 20 and 30 microns, respectively.

EXAMPLE 2

An aqueous dispersion including 30% by weight of a microcrystalline wax (C30, molecular weight 420, melting point 72° C.) was supplemented with ethyl alcohol and a polyurethane thickener to produce a dispersion with a viscosity of 138 kPa.s at 20° C.

The composition of the dispersion, expressed in parts by weight, comprised:

| | |
|---|---|
| microcrystalline wax (30% by weight aqueous dispersion) | 80 parts |
| ethyl alcohol | 20 parts |
| polyurethane thickener | 3.5 parts |

The aqueous dispersion was spread onto a sample of the film produced in Example 1 with dimensions of 30 cm×60 cm×30 microns, by means of a chromium-plated steel roller.

The treated film was dried at 100° C. for 15 seconds. The thickness of wax obtained was 0.6 microns.

The permeability of the film to water vapour at 38° C. and 90% relative humidity was 402 g×30 microns/m$^2$×24 h compared with 888 g×30 microns/m$^2$×24 h for the untreated film.

The same film treated with a second layer of wax enabled a coating 1.3 microns thick to be obtained, with a permeability to water vapour of 215 g×30 microns/m$^2$×24 h.

EXAMPLE 3

A sample of film produced as described in Example 1, with dimensions of 30 cm×60 cm×30 microns, was treated as described in Example 2 and then covered with a layer of polyethylene-acrylic acid.

The poli-ethylene-acrilic acid based coating was deposited by a chromium-plated steel roller with the use of an aqueous dispersion of the following composition, expressed in parts by weight:

| | |
|---|---|
| polyethylene-acrylic acid (ammonium salt) | 80 parts |
| isobutyl alcohol | 20 parts |

The thickness of the acrylic layer was 0.6 microns.

The permeability of this film to water vapour at 38° C. and 90% relative humidity was 210 g×30 microns/m$^2$× 24 h, compared with 880 g×30 microns/m$^2$×24 h for the untreated film.

EXAMPLE 4

A sample of film produced as described in Example 1, with dimensions of 30 cm×60 cm×30 microns, was treated as described in Example 2 and then covered with a hydrophobic layer constituted by a derivative of abietic acid (abietic acid with glycerine and phthalic acid, in which the abietic acid constituted 90% of the product by weight, was supplied).

The rosin derivative was used in a solution containing 70% by weight in acetone and was deposited with a chromium-plated steel roller.

Drying was carried out at 80° C. for 30 seconds. The thickness of the layer was 1.0 micron.

The permeability of the film to water vapour at 38° C. and 90% relative humidity was 111 g×30 microns/m$^2$ per 24 h compared with 880 g×30 microns/m$^2$ per 24 h for the untreated film.

EXAMPLE 5

A sample of film produced as described in Example 1, with dimensions of 30 cm×60 cm×30 microns, was treated as described in Example 2 and then covered with a layer of polyvinyl acetate in an aqueous dispersion containing 35% by weight.

The coating was deposited with a chromium-plated steel roller. Drying was carried out at 100° C. for 30 seconds.

The permeability of the film to water vapour at 38° C. and 90% relative humidity was 470 g×30 microns/m$^2$×24 h.

EXAMPLE 6

The surface of a sample of film 30 microns thick, produced as described in Example 1, was treated, with the use of a wax-lamination system, with a product constituted by 80 parts by weight of paraffin wax and 20 parts by weight of polyethylene-vinyl acetate (vinyl acetate content 28%, melt index 150), in the fused state.

The surface treatment of the film was carried by a "hot melt" surface-treatment machine. The thickness of the coating was 7 microns.

The permeability of the film to water vapour at 38° C. and 90% relative humidity was 20 g×30 microns/m$^2$×24h.

EXAMPLE 7

Two samples of film 20 microns thick, produced as described in Example 1, were joined together with the use of the mixture described in Example 6.

The resulting film was constituted by two layers 20 microns thick of the film described in Example 1, and an intermediate hydrophobic layer 7 microns thick as described in Example 6.

The permeability of the film to water vapour at 38° C. and 90% relative humidity was 30 g/×3 microns/m$^2$×24 h.

EXAMPLE 8

Two samples of film 20 microns thick produced as described in Example 1, were joined together with the use of a mixture constituted by 80 parts by weight of carnauba wax and 20 parts by weight of poly-epsilon-caprolactone. The resulting film was constituted by two layers of film 20 microns thick as described in Example 1, and by an intermediate hydrophobic layer 7 microns thick.

The permeability of the film to water vapour at 38° C. and 90% relative humidity was 52 g×30 microns/m$^2$×24 h.

The term "film" as used in the present description is intended also to include sheets for thermoforming, the surfaces of which have been treated with the waxy coatings described above.

The invention also includes articles with fairly thin walls, such as articles produced by injection and co-injection and co-blown bottles, the walls of which have a composite structure formed by at least one starchy layer and one or more layers of wax or a mixture of waxes, alone or in combination with a thermoplastic polymer.

The uses of the products according to the invention include, in particular, the production of refuse sacks or bags films for hygiene/sanitary articles such as nappies, sanitary towels and colostomy bags, containers, for example, for cosmetic products and for food and cutlery.

What is claimed is:

1. A biodegradable laminated film comprising two layers:
   (a) a first layer comprising a starch; and
   (b) a hydrophobic layer adjacent to, and in contact with, the first layer, comprising
      (i) from 10 to 100% by weight of a wax selected from the group consisting of natural waxes, synthetic waxes and mixtures thereof; and
      (ii) from 0 to 90% by weight of a synthetic polymer.

2. A biodegradable laminated film according to claim 1, wherein the wax is a petroleum wax selected from the group consisting of paraffin waxes having n-alkane contents of from 75% to 100% and average molecular weights of from 280 to 560 and microcrystalline waxes composed of isoparaffinic and naphthenic hydrocarbons saturated with n-alkanes and having molecular weights of from 450 to 800 and melting points of from 50° to 90° C.

3. A biodegradable laminated film according to claim 1, wherein the wax is an animal wax selected from beeswax and spermaceti wax.

4. A biodegradable laminated film according to claim 1, wherein the wax is a vegetable wax selected from the group consisting of candelilla wax, carnauba wax, Japan wax, ouricury wax, bayberry wax, jojoba wax and mixtures thereof.

5. A biodegradable laminated film according to claim 1, wherein the wax is a mineral wax.

6. A biodegradable laminated film according to claim 1, wherein the wax is a synthetic wax selected from the group consisting of Fischer-Tropsch wax, polyethylene wax, fatty acids and amides of fatty acids.

7. A biodegradable laminated film according to claim 1, wherein the synthetic polymer comprises a material selected from the group consisting of poly-ethylene-vinyl alcohol, poly-ethylene-acrylic acid, poly-ethylene-acrylic acid-alkyl acrylate, polyvinyl acetate, ethylene-vinyl acetate copolymers, rosin and derivatives thereof, alkyd resins, natural gum and thermoplastic gum.

8. A biodegradable laminated film according to claim 7 wherein the synthetic polymer is present in an amount by weight up to 25% by weight of the wax.

9. A biodegradable laminated film according to claim 7, wherein the synthetic polymer comprises a derivative of rosin selected from abietic acid, levopimaric acid and palustric acid, esters thereof selected from methyl, ethyl, hexadecyl, oxypyranylmethyl, 2-hydroxyethyl and 3-hydroxyphenyl esters, and esters of 1,2,3-propantriol.

10. A laminated film according to claim 7, wherein the synthetic polymer comprises a derivative of rosin selected from the addition products of abietic acid, levopimaric acid or palustric acid formed with maleic anhydride and polymers of those acids with glycols and phthalic acids.

11. A laminated film according to claim 1, wherein the hydrophobic layer is obtained from an emulsion comprising surfactants and stabilizers selected from the group consisting of alkyl sulphates, aryl sulphates, alkyl sulphonates, aryl sulphonates, derivatives of ethylene oxide, fatty acids, alkylamine salts, quaternary ammonium salts, starch, dextrin, hydroxyethyl cellulose, hydroxypropyl cellulose, carboxymethyl cellulose (sodium salt), methyl cellulose and polyvinyl alcohol.

12. A biodegradable laminated film according to claim 11, wherein the hydrophobic layer further comprises an alcohol selected from the group consisting of methyl, ethyl, propyl, isopropyl, butyl and isobutyl alcohols.

13. A biodegradable laminated film according to claim 11, wherein the hydrophobic layer further comprises a glycol selected from the group consisting of 2-methoxyethanol, 2-butoxyethanol, 2-ethoxyethanol, polyethylene glycol and polypropylene glycol.

14. A biodegradable laminated film according to claim 11, wherein the emulsion further comprises a thickener selected from the group consisting of starch, methyl cellulose, hydroxyethyl cellulose, alginates, casein and polyurethanes.

15. A laminated film according to claim 1, wherein the hydrophobic layer is obtained from an emulsion comprising a plasticizer selected from the group consisting of dibutyl phthalate, n-heptyl acrylate, 2-ethylhexyl acrylate, 2-ethylhexyl maleate, 2-ethylhexyl fumarate, dibutyl sebacate, polyglycol adipate, tricresyl phosphate, dioctyl phthalate and tributoxyethyl phosphate.

16. A biodegradable laminated film according to claim 1, wherein the hydrophobic layer further comprises fillers and pigments, the fillers and pigments being selected from the group consisting of titanium dioxide, talc, calcium carbonate and silica.

17. A laminated film according to claim 1, wherein the synthetic polymer comprises a material selected from the group consisting of ethylene-vinyl alcohol copolymers, ethylene-acrylic acid copolymers, ethylene-acrylic acid-alkyl acrylate copolymers, polyvinyl acetate, ethylene-vinyl acetate copolymers, rosin and derivatives of rosin, alkyd resins and natural gum.

18. A laminated film according to claim 1, wherein the synthetic polymer comprises a material selected from the group consisting of ethylene-vinyl acetate copolymers, ethylene-acrylic acid, ethylene-acrylic acid-alkyl acrylate, polyethylene-vinyl alcohol copolymers, polyhydroxyalkanoate, homopolymers of lactic acid, poly-epsilon-caprolactone, lactic acid copolymerized with glycolic acids and/or epsilon-caprolactone and fatty acids, the hydrophobic layer being deposited on the starchy layer by coextrusion, casting, or a hot-melt technique.

19. A laminated film according to claim 1, wherein the first layer further comprises a synthetic thermoplastic polymer selected from the group consisting of polyvinyl alcohols, ethylene-vinyl alcohol copolymers, ethylene acrylic acid copolymers, ethylene-vinyl acetate copolymers, and mixtures thereof.

20. A biodegradable laminated film according to claim 1 wherein the hydrophobic layer consists essentially of a wax selected from the group consisting of natural waxes, synthetic waxes, and mixtures thereof.

21. Articles produced by co-injection or co-blowing and which have walls with a composite structure comprising
   (a) a first layer comprising a starch; and
   (b) a hydrophobic layer adjacent to, and in contact with, the first layer, comprising
      (i) from 10 to 100% by weight of a wax selected from the group consisting of natural waxes, synthetic waxes and mixtures thereof; and
      (ii) from 0 to 90% by weight of a synthetic polymer.

* * * * *

UNITED STATES PATENT AND TRADEMARK OFFICE
CERTIFICATE OF CORRECTION

PATENT NO. : 5,512,378
DATED : April 30, 1996
INVENTOR(S) : Catia Bastioli, et al.

It is certified that error appears in the above-indentified patent and that said Letters Patent is hereby corrected as shown below:

| Column | Line | |
|---|---|---|
| 1 | 59 | after "90° C" delete "." |
| 3 | 12 | after "L" delete "." |
| 5 | 7 | after "72° C" delete "." |
| 6 | 41 | after "30 g/" delete "x3"    --30-- |
| 6 | 53 | after "38° C" delete "." |

Signed and Sealed this

Twenty-ninth Day of October 1996

Attest:

BRUCE LEHMAN

*Attesting Officer*    *Commissioner of Patents and Trademarks*